United States Patent [19]

Davis

[11] 4,015,238
[45] Mar. 29, 1977

[54] METRIC UPDATER FOR MAXIMUM LIKELIHOOD DECODER

[75] Inventor: Robert Curtis Davis, Melbourne Beach, Fla.

[73] Assignee: Harris Corporation, Cleveland, Ohio

[22] Filed: Nov. 24, 1975

[21] Appl. No.: 634,904

[52] U.S. Cl. ............ 340/146.1 AQ; 340/146.1 AV
[51] Int. Cl.² ......................................... G06F 11/12
[58] Field of Search ........ 340/146.1 AQ, 146.1 AV

[56] References Cited
UNITED STATES PATENTS

| | | | |
|---|---|---|---|
| 3,538,497 | 11/1970 | Harmon | 340/146.1 AQ |
| 3,697,950 | 10/1972 | Low et al. | 340/146.1 AQ |
| 3,789,360 | 1/1974 | Clark, Jr. et al. | 340/146.1 AQ |
| 3,805,236 | 4/1974 | Battail | 340/146.1 AQ |
| 3,872,432 | 3/1975 | Bismarck | 340/146.1 AQ |

Primary Examiner—Charles E. Atkinson

[57] ABSTRACT

In a convolutional code decoder, a current received input corresponds to a last data state of a received sequence. Path metrics, respective correlations of the received sequence to each of a limited number of possible sequences, are determined to choose the "correct" possible sequence. Decoding then proceeds by known means. The current input addresses "look-up" memories, each associated with a possible input data state and providing a "branch metric address" output. "Update" memories, each associated with one of the data states, are each addressed by path metrics of prior sequences which can enter its associated state and by one "branch metric address." In functional effect, each "update" memory adds a separate branch metric to update each prior path metric leading into each state. Path metrics for the limited number of possible sequences are thus provided. An indication of which updated path metric is larger for each state and its value are output from each "update" memory. The largest of the updated path metrics provided by the memories identifies the "correct" possible sequence.

7 Claims, 12 Drawing Figures

FIG. 1

UPPER BRANCH OF EACH PAIR CORRESPONDES TO AN INPUT POLARITY OF ZERO, LOWER BRANCH CORRESPONDS TO AN INPUT POLARITY OF ONE

| | | $r_1, e_1$ | | | | | | | |
|---|---|---|---|---|---|---|---|---|---|
| | | 0 | 1 | 2 | 3 | 4 | 5 | 6 | 7 |
| $r_2, e_2$ | 0 | $m_{00}$ | $m_{10}$ | $m_{20}$ | $m_{30}$ | $m_{40}$ | $m_{50}$ | $m_{60}$ | $m_{70}$ |
| | 1 | $m_{01}$ | $m_{11}$ | $m_{21}$ | $m_{31}$ | $m_{41}$ | $m_{51}$ | $m_{61}$ | $m_{71}$ |
| | 2 | $m_{02}$ | $m_{12}$ | $m_{22}$ | $m_{32}$ | $m_{42}$ | $m_{52}$ | $m_{62}$ | $m_{72}$ |
| | 3 | $m_{03}$ | $m_{13}$ | $m_{23}$ | $m_{33}$ | $m_{43}$ | $m_{53}$ | $m_{63}$ | $m_{73}$ |
| | 4 | $m_{04}$ | $m_{14}$ | $m_{24}$ | $m_{34}$ | $m_{44}$ | $m_{54}$ | $m_{64}$ | $m_{74}$ |
| | 5 | $m_{05}$ | $m_{15}$ | $m_{25}$ | $m_{35}$ | $m_{45}$ | $m_{55}$ | $m_{65}$ | $m_{75}$ |
| | 6 | $m_{06}$ | $m_{16}$ | $m_{26}$ | $m_{36}$ | $m_{46}$ | $m_{56}$ | $m_{66}$ | $m_{76}$ |
| | 7 | $m_{07}$ | $m_{17}$ | $m_{27}$ | $m_{37}$ | $m_{47}$ | $m_{57}$ | $m_{67}$ | $m_{77}$ |

FIG.11

| | | $e_1$ | | | | | | | |
|---|---|---|---|---|---|---|---|---|---|
| | | 0 | 1 | 2 | 3 | 4 | 5 | 6 | 7 |
| $e_2$ | 0 | 0 | 0 | 0 | 0 | 0 | −1 | −1 | −2 |
| | 1 | 0 | 0 | 0 | −1 | −1 | −1 | −1 | −2 |
| | 2 | 0 | 0 | 0 | −1 | −1 | −1 | −1 | −2 |
| | 3 | 0 | −1 | −1 | −1 | −1 | −2 | −2 | −2 |
| | 4 | 0 | −1 | −1 | −1 | −1 | −2 | −2 | −2 |
| | 5 | −1 | −1 | −1 | −2 | −2 | −2 | −2 | −3 |
| | 6 | −1 | −1 | −1 | −2 | −2 | −2 | −3 | −3 |
| | 7 | −2 | −2 | −2 | −2 | −2 | −3 | −3 | −3 |

FIG.12 $m_{(7-e_1)(7-e_2)}$

| $m_{e_1 e_2}$ | 0 | −1 | −2 | −3 |
|---|---|---|---|---|
| 0 | | | X | X |
| −1 | | | X | X |
| −2 | X | X | X | |
| −3 | X | | | |

METRIC UPDATER FOR MAXIMUM LIKELIHOOD DECODER

BACKGROUND OF THE INVENTION

The present invention relates to maximum likelihood convolution code decoders, and particularly to a trellis connection computer included therein for providing outputs indicative of survivor paths in a maximum likelihood convolution code decoder.

The present invention relates to a trellis connection computer for use in a maximum likelihood convolution code decoder such as one disclosed in U.S. Pat. No. 3,789,360 to Clark and Davis, Jan. 29, 1974, which is assigned to the assignee herein, the disclosure of which is incorporated herein by reference. Also incorporated by reference is U.S. Pat. No. 3,789,359, also issued Jan. 29, 1974 to Clark and Davis and assigned to the assignee herein, which discloses means for synchronizing operation of a convolution code decoder with reception of data. In a convolution code decoder, each received data input is treated as the most recent or last transition or branch into a data state of a current sequence of data states each entered in response to previously received data inputs during previous branch intervals. In decoding convolutional data, a number of possible data sequences are constructed whose respective correlations with the sequence indicated by received data are each computed. An algorithm for selecting the limited number of likely sequences is disclosed by A. G. Viterbi, "Error Bounds for Convolutional Codes and an Asymptotically Optimum Decoding Algorithm," IEEE Transactions of Information Theory, Vol. IT-13, No. 2, pp 260–269, April, 1967.

In the use of the Viterbi algorithm, possible data sequences are considered entering each possible data state entered, and the likelihood of entering each state from a prior sequence in response to a current data input is considered. One possible sequence ending in each data state is selected as a survivor sequence. The survivor sequence ending in the data state is the one having the highest correlation with the received data of all of the sequences entering that state. (It is noted that the prior sequences are those which still survived after a similar selection was made at each of the number of preceeding branch intervals in response to previous input data.) In accordance with the algorithm, a comparison is made among survivor sequences to ascertain which sequence is the most highly correlated with the data actually received. The sole survivor sequence thus identified is assumed to be "correct", i.e. to be the sequence that was originally transmitted, and is called the sole survivor sequence. Decoding of message digits based on this assumption is then carried out, for example by the apparatus of the Clark and Davis U.S. Pat. No. 3,789,360 patent.

Decoding apparatus in one form includes tracing apparatus which reconstructs at least one of the survivor sequences step by step by utilizing stored sequential data which describes the branch transitions of paths between states for a sequence under consideration. The tracing apparatus identifies the state or states that were occupied by survivor sequences at the earlier branch interval when the bit currently to be decoded was received. Logic circuits then interpret the state of information to decode a message bit or bits of the original message. A trellis connection computer is the apparatus which provides the data indicative of survivor sequences and sole survivor sequences to the tracing apparatus.

Thus means must be provided to generate the values of the various correlations described above so that survivor and sole survivor sequences may be selected. These values are called metrics. A path metric is a measurement of the goodness of match between a possible sequence and received data. A branch metric measures the likelihood of a transition from a prior data sequence to a particular data state. Path metrics are updated by branch metrics as new data inputs are received. Prior circuits require computation of path metrics. The necessity to calculate metrics may increase operating time over a system in which proper path metrics are conveniently accessed. Further, it is desirable to simplify circuitry providing signals indicative of metric values. This reduces the number of microcircuit "chips" required to fabricate a decoder, thus reducing cost and most likely increasing reliability.

Further, prior convolution code decoders may include complex circuitry due to the circuitry required to accomodate a wide range of large numerical values of metrics. Commonly processing circuitry is binary, and an extra stage of processing circuitry is required for each power of two by which metric values increase. It is desirable to provide a truncated range of metrics while maintaining the ability to select the proper sole survivor sequence.

SUMMARY OF THE INVENTION

It is therefore an object of the present invention to provide a trellis connection computer of the type described in which path metrics are stored and accessed rather than being recomputed during each operating cycle.

It is also an object of the present invention to provide a trellis connection computer in which survivor metrics are provided from a memory in response to addressing of the memory by prior path metrics and an address indicative of branch metrics.

It is another object of the present invention to provide a trellis connection data generator for inclusion in a maximum likelihood decoder which is simplified in construction and requires a minimum number of data cycles for operation.

It is a further object of the present invention to provide a trellis connection data generator of the type described which may be constructed using a minimum number of integrated circuit chips.

It is also an object of the present invention to provide a simplified range of values for branch and path metrics whereby accuracy of decoding is maintained while greatly simplifying circuitry.

Briefly stated, in accordance with the present invention there is provided a trellis connection computer for providing trellis connection data to tracing means in a maximum likelihood convolution code decoder and for providing updated path metrics. A data input comprises the most recent state of a sequence and is supplied to a memory associated with one possible data to state access an output address. A metric updater memory is provided and is addressed by the output address and by path metrics of possible paths leading into that state. The metric updater memory provides a first output indicative of the metric assocated with a survivor path and a second output indicative of which path possibly entering the state was the survivor path. The memory is prewired and the addresses are arranged such that addressing the memory in this manner functions in effect to add an appropriate branch metric to the metric of each possible path entering the state to provide an updated metric and to select the larger metric as the survivor metric, thus providing the updated survivor metric and the indication of which path was the survivor path. The largest updated path metric indicates the sole survivor path. A truncated range of metric values is utilized to simplify circuitry while maintaining accuracy. Indications of which paths were survivor and sole survivor paths are connected to known tracing means for completion of decoding in a known manner.

BRIEF DESCRIPTION OF THE DRAWINGS

The means by which the foregoing objects and features of invention are achieved are pointed out with particularity and the claims forming the concluding portion of the specification. The invention, both as to its organization and manner of operation may be further understood by reference to the following description taken in connection with the following drawings.

Of the drawings.

DESCRIPTION OF THE PREFERRED EMBODIMENT

General System

Figure 1:
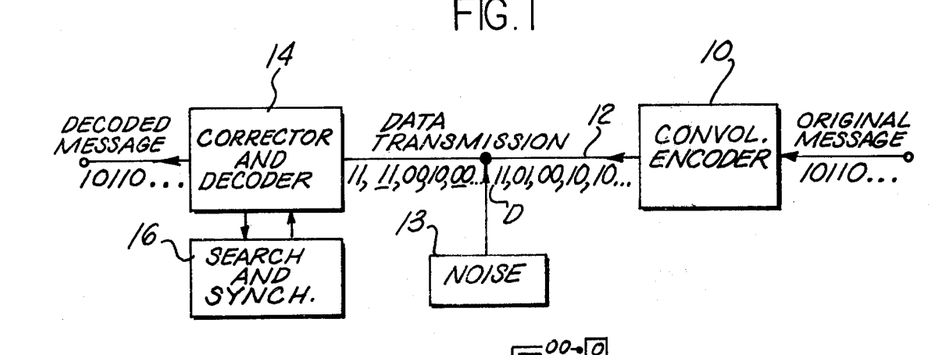
FIG. 1 is a block diagramatic representation of a typical digital data transmission system utilizing the decoder of the present invention.
Figure 5:
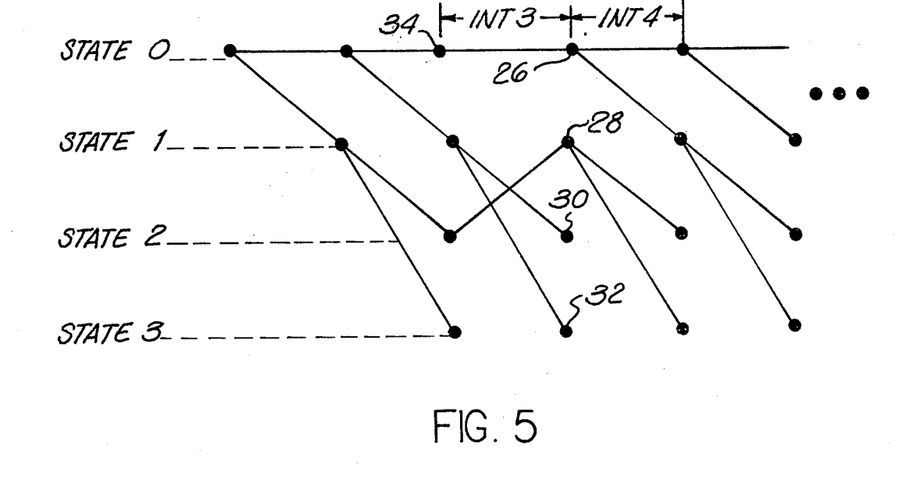
FIG. 5 is another trellis diagram used to illustrate the concepts of survivor paths and sole survivor paths.
Figure 6:
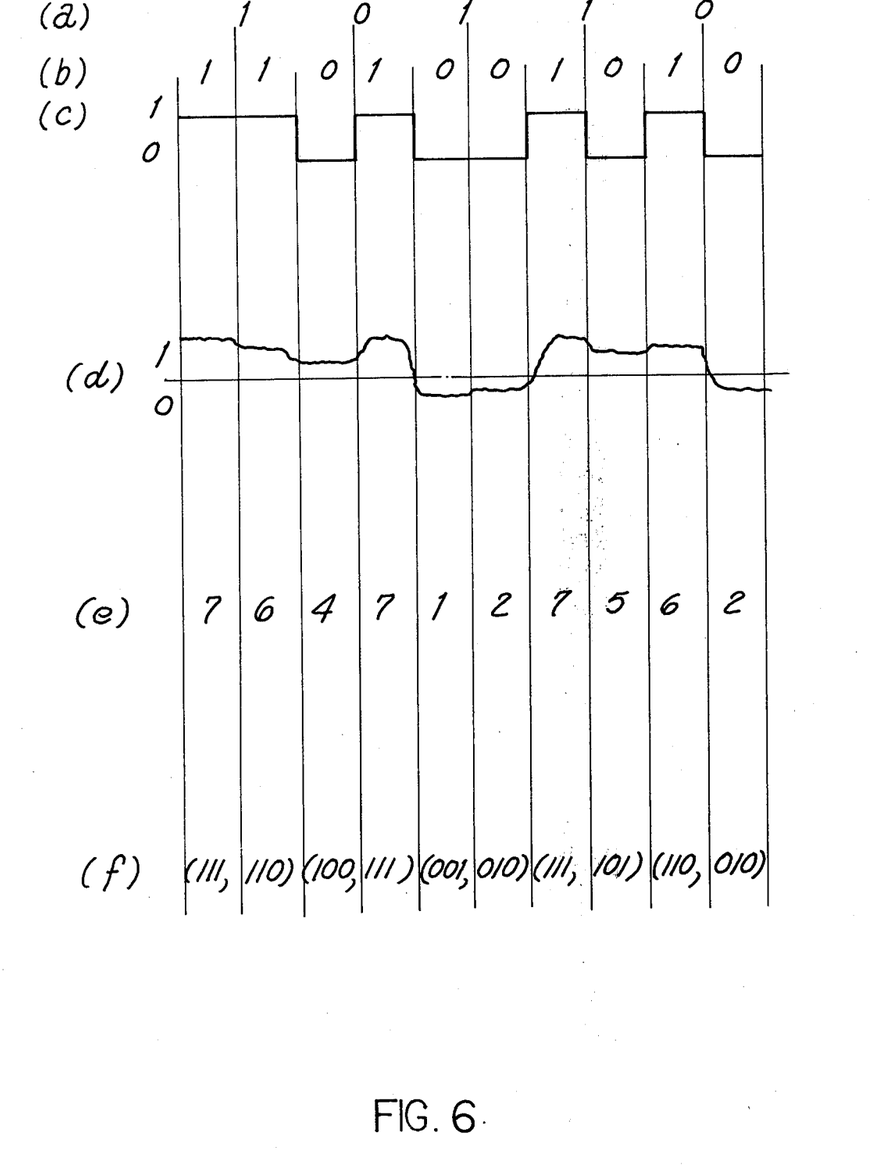
FIG. 6 is a graphical illustration useful in understanding quantization of input data.
Figure 7:
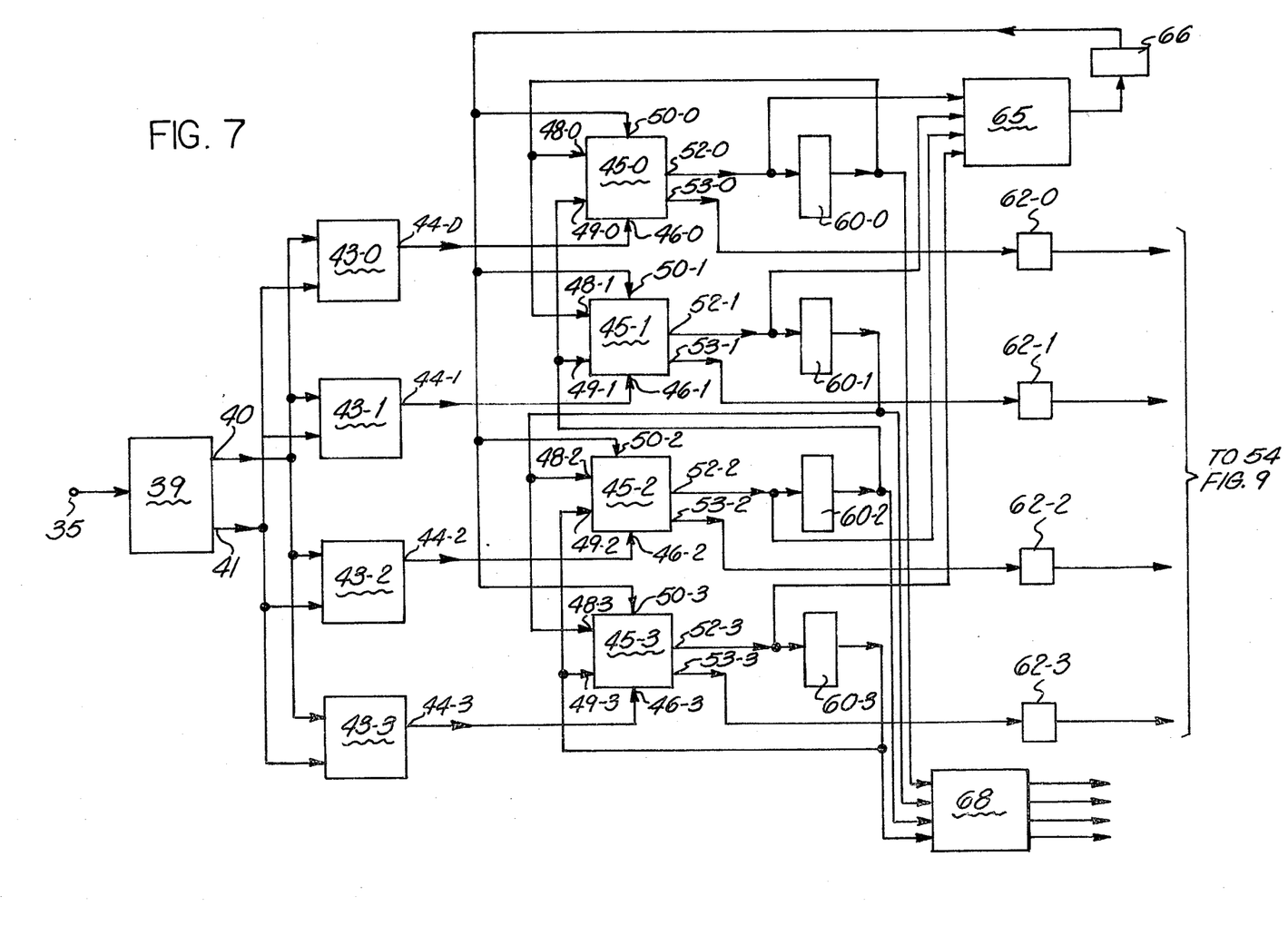
FIG. 7 is a block diagrammatic representation of a trellis connection data computer constructed in accordance with the present invention for a constraint length three code for determining survivor and sole survivor paths.

FIGS. 1–6 and the descriptions thereof describe convolution encoding and decoding in order to provide a useful context for the invention illustrated in FIG. 7. FIG. 1 is a block diagrammatic illustration of a typical data transmission and reception system in which an original message consisting of a sequence of successive data digits is entered into a well-known convolutional encoder 10 which encodes the data into a longer, redundant sequence of data having convolutional form.

The encoder 10 of the present embodiment chosen for illustration has a constraint length of K of three. A data rate of one-half is also selected for the present illustrated embodiment. In other words, a two digit pair is transmitted for each original message digit. The convolutional data is transmitted by conventional means over a data transmission channel 12 subject to noise. Conventional noise is illustrated as a noise source 13 providing an input to the channel 12. The channel 12 terminates at a corrector and decoder 14 which in accordance with convolutional decoding techniques corrects noise-corrupted data and decodes received data to provide a correct output message stream. The corrector and the decoder 14 is henceforth referred to as the decoder 14 since correction is inherent in the decoding process. A "search and synchronizing" circuit 16 synchronizes decoding operation with reception of the convolutional code data. The circuit 16 is described in the aforementioned U.S. Pat. No. 3,789,359 to Clark and Davis. As described below, the decoder 14 provides a sequence of successive data digits which is correct with respect to the original message supplied to the encoder 10.

Figure 2:
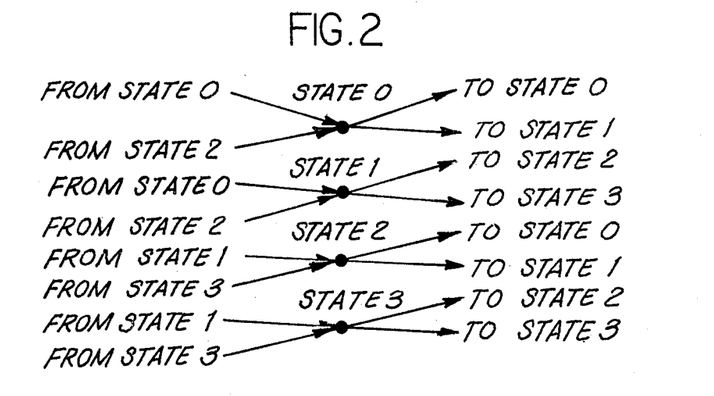
FIG. 2 is a chart illustrating operation of a known form of convolutional code encoder having a constraint length of three.

FIG. 2 is a graphical representation of the encoding scheme performed by the encoder 10 in terms of data states of the encoder (FIG. 1). A conventional well-known encoder such as one including a shift register (not shown) having various stages connected for modulo-two addition is utilized. In the present exemplification, a decoder having a constraint length K of three is utilized. The bits of a data sequence are shifted in serially into the K register stages so that each group of K bits comprises K-1 bits already in the encoder plus the new bit shifted into the encoder. Thus the combination of K-1 bits already in the encoder will be one group out of $2^{K-1}$ possible groups. Each group in the encoder thus comprises a state which will respond in a predetermined way to a predetermined input (a binary 0 or a binary 1) in an identical manner each time that state is in the encoder. Where $K=3$, $2^{K-1}$ equals 4. Each discrete state is arbitrarily numbered by a consecutive integer. The four states are numbered by the four consecutive integers zero through three. In FIG. 2, the middle column illustrates the four possible states of the encoder 10. The left column illustrates the state capable of entering each state, and the right column illustrates the states which may be entered from each state. Further, in the encoder 10 of the present invention, two digits are to be output for each one digit in. This defines a code rate of one-half. Which two digits comprise the output is a function of state changes and is described further with respect to FIG. 3.

Figure 3:
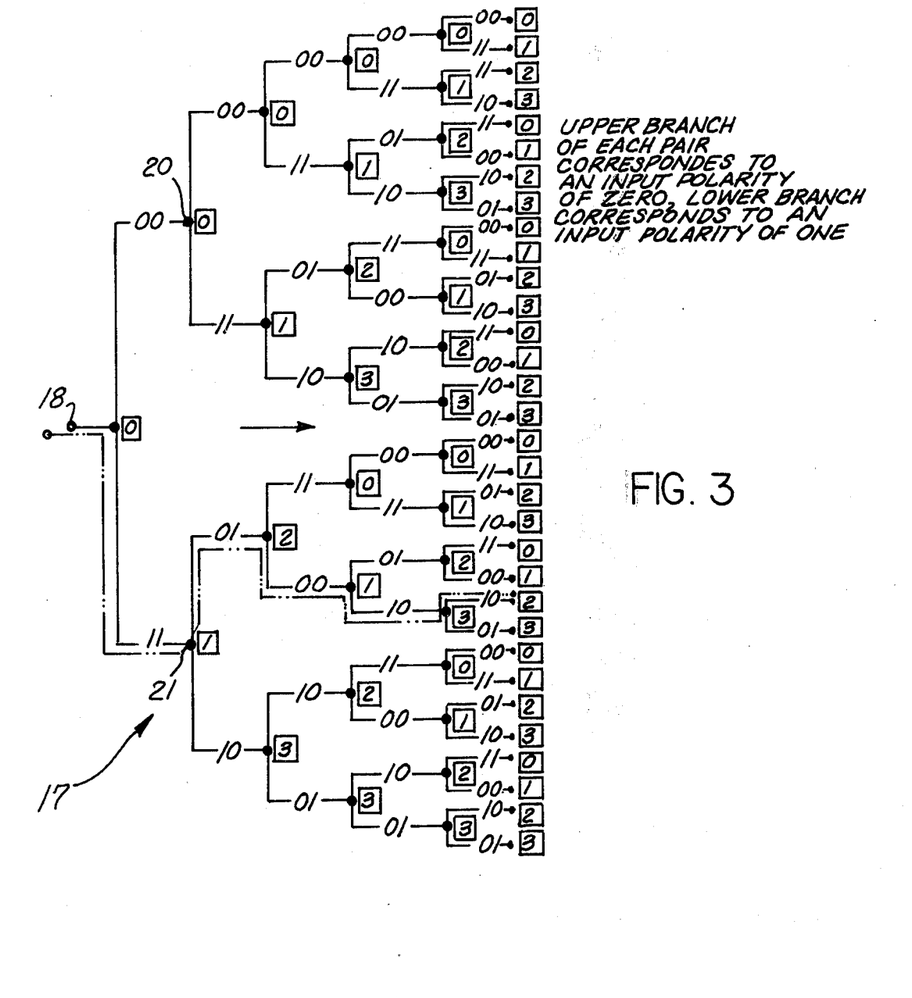
FIG. 3 is a graphical representation, referred to as a tree of possible code data sequences, illustrating encoding a short segment of convolutional code data by the encoder represented by FIG. 2 having a rate of one half.

The chart of FIG. 3 may be referred to as a code tree 17. The encoder begins at a zero state. There are two possible inputs to the decoder, a zero or a one. The convention will be followed that provision of a zero will be an "upper" transition and provision of a one will be a "lower" transition. The convention of "upper" and "lower" transitions described above is maintained here and below. However, it should be understood that this convention is an aid in explanation, and need not be followed in construction of other embodiments. Each node in FIG. 3 represents the point at which a new digit is shifted into the register of the encoder 10. Each node of FIG. 3 is labeled with its state number in a small square. A portion of the tree 17 emanating from one node is the same as the portion of the tree emanating from another node having the same state.

Thus starting at node 18 of state zero, a zero binary will cause an upper transition to a node 20 and a binary one will provide a lower transition to a node 21. An upper transition from the node 18 in the zero state results in the decoder outputting two digits 0,0, and the decoder is taken to state zero. A lower transition results in the output of a 1,1 two-digit output and in taking the decoder to state one. Upper and lower transitions from state one respectively result in taking the decoder to states two and three and respectively outputting a 0,1 or 1,0. Upper and lower transitions from state two respectively go to state zero or state one outputting a 1,1 or 0,0 respectively. Upper and lower transitions from state three respectively go to state two or state three respectively putting out a 10 or 01 digit pair in the process. FIG. 3 thus represents all the possible outputs for a five digit sequence input to the encoder 10. The encoding of the original message data sequence 10110 of FIG. 1 is traced in dotted lines through FIG. 3. Starting at the node 18, this sequence may be viewed as lower, upper, lower, lower and upper transitions. Consequently, the original data stream provided by the encoder 10 to the transmission channel 12 is 11, 01, 00, 10 and 10. Since a sequence of five digit pairs is considered, the decoding depth is five. When a sixth digit of the original message stream is provided, e.g. 1, it is treated as the last digit of the sequence 01101 beginning at node 21.

Figure 4:
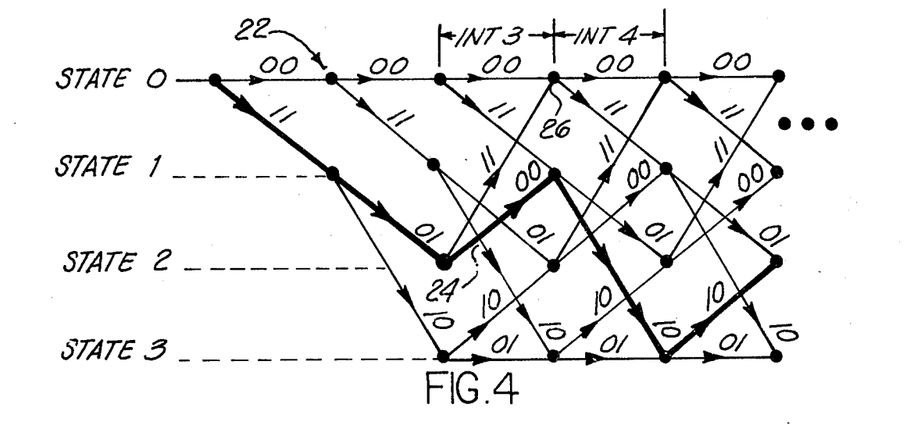
FIG. 4 is a trellis diagram representing possible code data sequences encoded according to FIGS. 2 and 3 in terms of data states.

FIG. 4 is a representation of the transitions of states in the form of a trellis diagram 22. Each horizontal line of dots represents a common state of the encoder, and each vertical column of dots represents possible states at a given time. Intervals between each column of dots are branch intervals, abbreviated "INT" in the drawing. FIG. 4 is another representation of the performance of the encoder illustrated in FIG. 2. The upper transitions from each node leads to one state and the lower transition of a node leads to another state. Thus the encoding of the original message 10110 may be traced along the bold line in FIG. 4 remembering that a one is a lower transition and a zero is an upper transition. The step from one data input to the next is a branch interval. The bold line in FIG. 4 represents a path or sequence from branch interval to branch interval indicative of the original message sequence. This path when reconstructed by the decoder 14 in response to transmitted data will cause the decoder 14 to provide output digits indicative of the original message data sequence.

In a decoder 14, a number of possible paths are effectively constructed. Possible paths are provided ending in each of the states zero through three. It is the function of the decoder 14 to provide correlations, or metrics indicative of the goodness of match of the possible paths which have been generated and the path indicated by the data actually received. These correlations are utilized for effectively reconstructing the correct data path in the decoder 14 from which the original message sequence is derived.

FIG. 5 is a trellis diagram depicting a numerical example unrelated to FIGS. 1–4 for illustrating the concepts of survivor paths and sole survivor paths, which are determined in reconstructing the original data path. Referring to FIG. 5, there are nodes 26, 28, 30 and 32 each respectively associated with the states 0, 1, 2 and 3 at the end of branch interval 3. They show only one path of the two possible paths entering each state. The other path entering each state has been discarded in the present hypothetical situation because it had a lower correlation, determined by means to be discussed below, than the path which was retained. At the nodes at the end of branch interval 4, one path has again been selected as a survivor for entering into each of the states 0, 1, 2 and 3. In the example, no paths were drawn outward to the right from node 30 of state 2 at the end of branch interval 3 or from node 32 state 3 at the end of the branch interval 3. The paths corresponding to the nodes in states 2 and 3 at the end of branch interval were abandoned. At the end of each branch interval in FIG. 5, the survivor path which is chosen to enter each state is selected from among the paths which are capable of entering that state, and it is the one which has the highest correlation with data actually received. In this way, four survivor paths are always preserved. In the present example, one path terminating in each of the states at the end of the most recently received branch interval is preserved. The one of the four paths preserved having the highest correlation of the four survivor paths is called the sole survivor path. With respect to the data sequence under consideration, the sole survivor path is the correct path as far as the decoder is concerned and is indicative of the original data sequence.

The selection of survivor paths and a sole survivor path at a branch corresponds to one cycle of decoder operation. The next cycle of decoder operation selects the survivor paths and sole survivor path at a next branch. It should be noted that at each branch, the decoder examines a node and determines whether the survivor path leading came from one of two nodes of a previous branch, each of the two nodes having a previous survivor path terminating thereat. Since the trellis diagram of FIG. 4 may be effectively embodied in the decoder 14, once the decoder can determine which path was correct, it can determine which originally transmitted digits were produced to provide that path. Running correlations must be computed for each possible path because each sequence path under consideration has proceeded from an earlier path. As illustrated in FIG. 1 incorrect data may be transmitted. However, incorrect data may be unlikely as a portion of a sequence. Therefore, the likelihood of a path entering each state (correlation) is computed, and the path having the maximum likelihood is detected.

Circuitry provides trellis connection data indicative of survivor and sole survivor sequences. In one form of decoder, data indicative of trellis connections is connected to a tracing means (described below with respect to FIG. 9 and further described in U.S. Pat. No. 3,789,360 to Davis and Clark). In accordance with the present invention, improved means are provided for determining the decoder trellis connections.

QUANTIZATION OF INPUT DATA

FIG. 6 illustrates quantization of input data to the trellis connection data generator. FIGS. 6a–6f have a common time abscissa. FIGS. 6a and 6b respectively illustrate the original message sequence and two digit outputs, provided by the encoder 10 of FIG. 1. FIG. 6c illustrates the square waves that would represent the data of FIG. 6b in an ideal transmission system. However, since signals are generally degraded by noise and other parameters to which a transmission medium is subject, in a typical situation, an analog waveform such as that shown in FIG. 6d will be received in response to the waveform of FIG. 6c. The received data during time slots corresponding to times during which transmitted digits should be present will not correspond exactly to a binary 0 or 1. Therefore, in the present embodiment, a conventional analog to digital converter is utilized to quantize the received data so that the decoder may determine whether it was most likely that the received digit was indicative of a 0 or a 1. FIG. 6e illustrates the quantized analog level corresponding to each sample of the waveform of FIG. 8c. In the present embodiment, a degree of resolution is selected wherein an analog value of 0 corresponds to a binary 0, and an analog value of 7 corresponds to a binary 1. Quantization is performed by well-known analog to digital conversion means; the signal output means provides pairs of 3 bit binary numbers corresponding to digital representations shown in FIG. 6f of the analog level of signal pairs corresponding to the received signal pairs indicated as being provided to the decoder 14 in FIG. 1.

Trellis Connection Computer

Referring to FIG. 7 the trellis connection data generator is illustrated in block diagrammatic form. Conventional clocking circuitry (not shown) is provided. Input signal are supplied at a terminal 35 in the decoder 14 to an analog to digital converter 39 which operates in a well-known manner to provide outputs in accordance with FIG. 6f at terminals 40 and 41, each respectively indicative of the first and second digits of a pair produced in response to an originally encoded message digit and each consisting of a number of binary bits. One digit pair is provided simultaneously at the terminals 40 and 41 for each branch interval. For purposes of the present description provision of the outputs at the terminals 40 and 41 is referred to as a data input to the decoder. This terminology is utilized to reflect that the binary representation of the received digit pair is what the trellis connection computer "sees" as the new code branch data of the transitted sequence.

A plurality "branch metric look-up" read only memories 43 are provided. In the preferred form, one branch metric memory 43 is provided for each possible code branch. In the present exemplification, there are four possible code branches for the rate ½ code, and the four branch metric look-up memories are accordingly respectively denoted 43-0 through 43-3. Where the hyphen and numerical suffix are not recited, it is implied that similar components associated with each state are collectively referred to. This convention is followed with respect to other components of FIG. 7. The branch metric look-up memories 43 each have an address output terminal 44 respectively connected to one "metric update" memory 45.

The memories 43 each are used to provide indications of branch metrics. The data input described above is correlated with each possible code branch the input data could represent. The branch metric is used to update path metrics from a prior cycle. It should be noted that the output at the terminal 46 is not a branch metric, but an address indicative of a pair of branch metrics. This address cooperates with the other addresses supplied to each memory 45 to replace the function of accessing separate branch metrics to be added to the prior path metrics. The address supplied from the terminal 46 is $b$ binary bits long. The value of $b$ depends on the number of ranch metric pairs that must, in functional effect, be accessed. It should be noted that values of correlations of possible branches to various received data branches are known in the art.

In the present embodiment, four metric update memories 45-0 through 45-3 are provided each corresponding to one state. Each branch metric look-up memory 43 is connected to its associated metric update memory 45 at a terminal 46. Each metric update memory 45 has further upper and lower address terminals 48 and 49, a rescaling input terminal 50, and output terminals 52 and 53.

After each operating cycle, each metric update memory 45 provides a multi-bit $m$ bits long output at its output terminal 52 comprising the survivor path metric for the state associated therewith. The output terminals 52-0 through 52-3 are respectively connected to survivor path metric storage registers 60-0 through 60-3. An output bit indicative of which possible path entering the state associated with the memory 45 was selected as the survivor path is provided at the output terminal 53 and coupled to a trellis connection flip-flop 62. The output terminals 52-0 through 52-3 are all connected to a rescale detect circuit 65 which provides an output to a rescale bit flip-flop 66 at appropriate times in a manner described below. The output of the rescale bit flip-flop 66 is connected to the rescaling terminal 50-0 through 50-3. Outputs of the storage registers 60 are also all connected to a comparator 68, which provides an output indicative of which survivor path metric is the largest.

The survivor path metric storage registers 60-0 through 60-3 provide appropriate addresses at the terminal 48 and 49 of each metric update memory 45. Each metric updater memory 45 is addressed by the path metrics of the survivor paths of a previous cycle which terminates in the states that can lead into the state associated with the particular metric updater memory 45. Since the "upper" transition to state zero is from state zero and since the "lower" transition to state zero is from state two, storage register 60-0 is connected to address terminal 48-0, and storage register 60-2 is connected to address terminal 49-0. Similarly, address terminals 48-1 and 49-1 are respectively connected to registers 60-0 and 60-2. Terminals 48-2 and 49-2 are respectively connected to survivor metric storage registers 60-1 and 60-3. Address terminals 48-3 and 49-3 are connected to storage registers 60-1 and 60-3 respectively. In this manner, each metric updater memory is addressed by the survivor paths metrics of the previous survivor paths capable of leading into the associated state. The outputs of this circuit are connected to the tracing circuit of FIG. 9 for decoding in a prior art manner as summarized below.

In other words, each memory 45 is addressed by the survivor path metric from a previous cycle at its upper address terminal representing the upper transition thereto and addressed at its lower address terminal 49 by the survivor metric from the previous cycle representing the lower transition thereto. The metric updater memories 45 are each programmed or prewired to provide in response to these addresses a survivor metric for a current cycle at the output terminal 52 and to provide an indication at the output terminal 53 whether the upper or lower transition was selected. The functional equivalent of this operation may be described as follows. The previous survivor metrics appearing at the terminal 48 and the terminal 49 each have added to them an appropriate branch metric denoted by the word at the input address terminal 46. The larger of the two resulting numbers is selected and output at the terminal 52.

Figure 8:
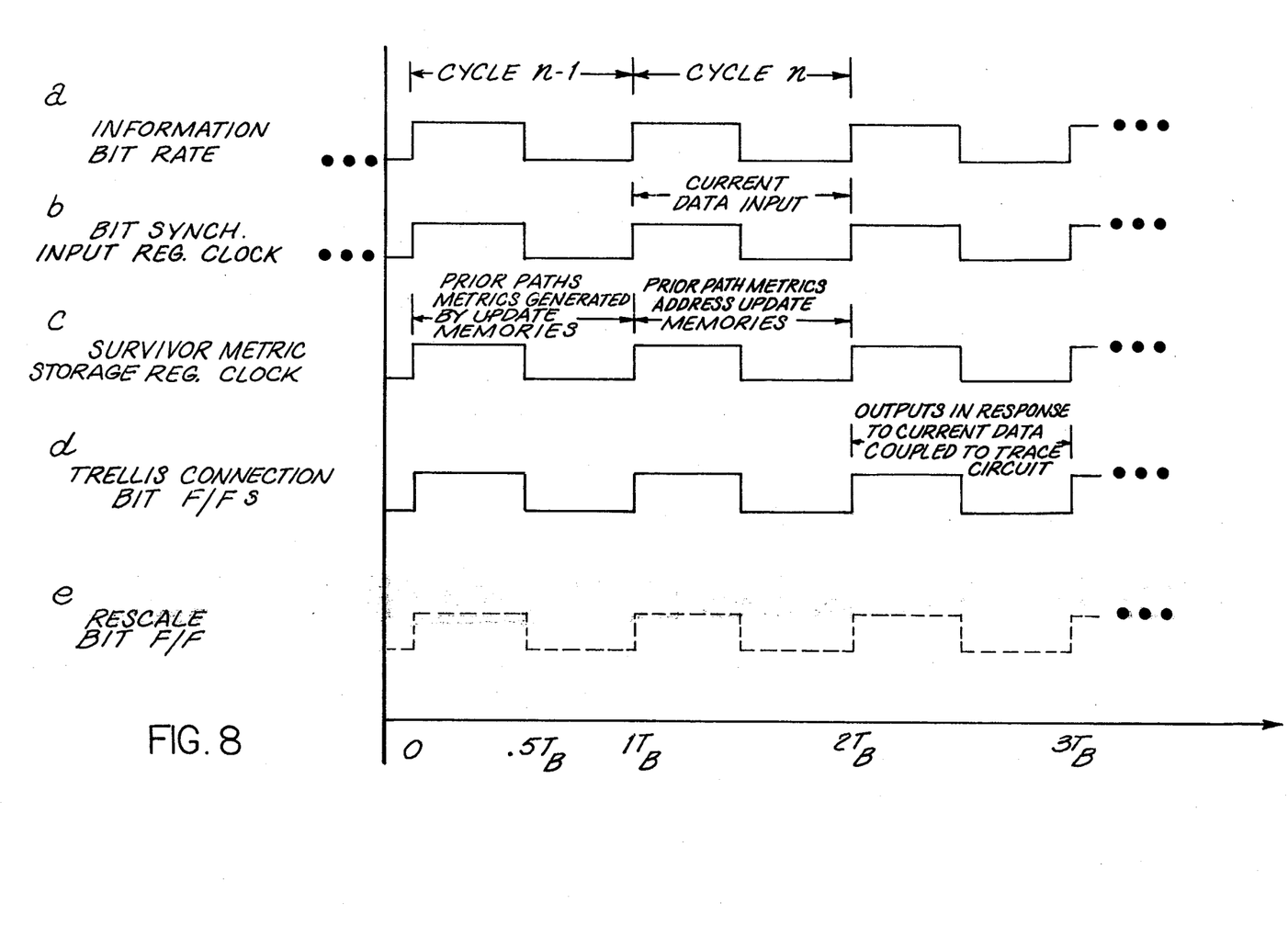
FIG. 8 is a timing diagram useful in understanding the operation of the apparatus of FIG. 7.

Further description is with respect to FIG. 7 and also with respect to FIG. 8 which is a waveform chart illustrating timing cycles in the operation of the present embodiment. In FIG. 8 each waveform has a common time abscissa, and the value $T_B$ corresponds to the length of one branch interval. FIG. 8a represents the rate at which the original message sequence digits (FIG. 1) are produced; FIG. 8b is labeled bit synch input register clock to illustrate the rate at which data inputs comprising pairs of outputs at the terminals 40 and 41 of FIG. 7 are provided; FIG. 8c represents the rate at which binary numbers indicative of path metrics are loaded into the storage registers 60 and is accordingly labeled survivor metric storage register clock; FIG. 8d is captioned trellis connection flip-flops to represent the rate at which output data is provided by the flip-flops 62; and FIG. 8e referred to as rescale bit flip-flop illustrates the synchronization of provision of rescaling bits to the terminals 50 with other data operations. This waveform is drawn in dotted lines since a rescale bit is not necessarily provided for a given cycle. Events of interest wth respect to components associated with portions of FIG. 8 are denoted to further illustrate operation.

It is assumed that the decoder has been operating for a number of cycles. Description is for a cycle $n$ corresponding to the branch interval from time $T_B$ to time $2T_B$ in FIG. 8, which is an arbitrarily selected cycle. Input data is clocked at time $T_B$ from the analog to the digital converter 39 into the registers 40 and 41. This data propagates to the address terminals of the branch look-up memories 43. The total of six bits of data, three bits corresponding to each digit of the data input, serves as an address to each memory 43. A precomputed "word" is stored chosen to correspond to a pair of path metrics generated during cycle $n-1$ associated with the two states which can enter state $i$, where $i$ is the one of state zero, one, two or three under consideration. For example, the address to the memory 43-0 accesses a word used to address the memory 45-0. As seen with reference to FIG. 2, state zero can be entered from state zero or state two. Thus, the address from the memory 43-0 is indicative of the metric of the received code branch entering state zero from two and the metric representing the correlation of the received digit entering state zero from state zero. Similarly, the memory 43-1 is prewired (or prewritten into) to effectively access a metric pair indicative of the likelihood of the currently received information entering state one from state zero or state two. The memory 43-2 thus produces an output word indicative of the likelihood of the currently received digit entering state two from state one or state three; the memory 43-3 outputs a word indicative of the metric pair entering state three from state one or state three. Again referring to FIG. 3, it is seen that state three can be entered from state one or state three. Thus the output of each memory 43-$i$ is connected to the address terminal 46-$i$ of each update memory 45-$i$.

After all these signals have propagated through the memories 43 and 45 and the appropriate registers and flip-flops 60 and 62, the registers 60 and 62 are clocked at time $2T_B$ to store updated information. The circuitry of FIG. 7 is then ready to receive the next six bits of input data from the registers 40 and 41 and repeat the operating cycle. At any branch time, the survivor metric storage registers 60 contain the best cumulative metric of any path into the particular state $i$ under consideration. The trellis connection bits appearing at the outputs of the flip-flops 62 and output of the comparator 68 are connected to the tracing circuit of FIG. 9 for decoding in a prior art manner as described below.

As noted above, each survivor metric is coupled from each output terminal 52 to the rescale detect circuit 65. The rescale detect circuit 65 compares all of the updated survivor metric next to a predetermined threshold level and outputs a binary "one" if this level is not exceeded. Since survivor metrics tend to decrease as noisy channel data is received, survivor metrics would generally tend to decrease below the range of storage registers in the circuit. The one bit rescale is fed to the input terminals 54 of each memory 45 to specify that "one" is to be added to all survivor metrics on the following branch time. This maintains the value of the largest survivor metric at the top of register range. Since the relative spacing between path metrics is the only thing of importance, increasing each path metric value by a like amount does not influence the decoder operation.

Figure 9:
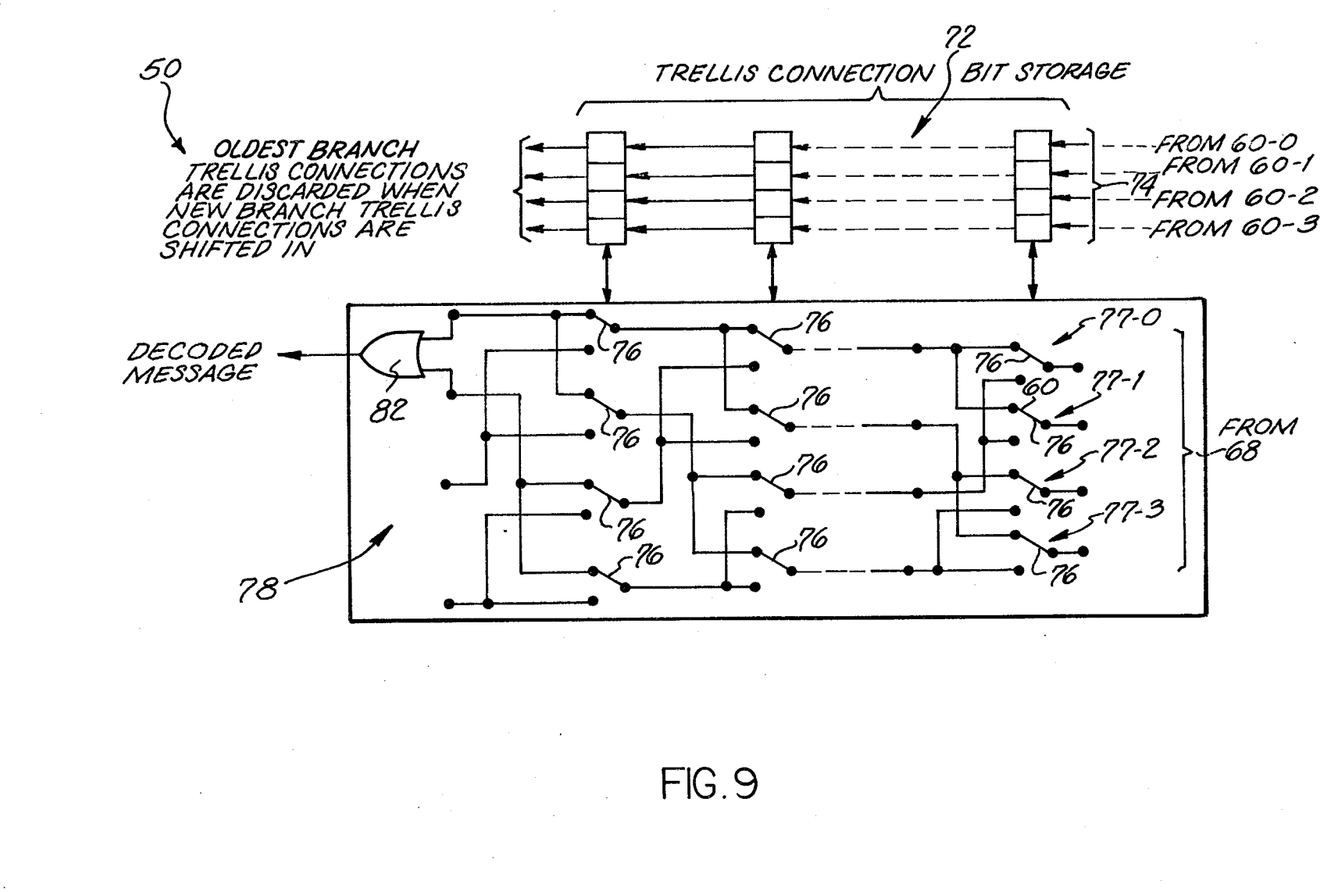
FIG. 9 is a block diagrammatic representation of a prior art trellis connection switch matrix decoder for decoding message bits in response to outputs of the circuit of FIG. 7.

Referring now to FIG. 9, the conceptual tracing means of the aforementioned Clark and Davis U.S. Pat. No. 3,789,360 is illustrated to aid in understanding the usefulness of the present invention. The trace means includes a trellis connection bit storage register 72 and a switch matrix 78 controlled thereby. The shift register 72 has rows of storage locations 72-0 through 72-3 arranged in columns corresponding to a predetermined number of cycles. Input means 74 connects individual inputs from the output flip-flops 62-0 through 62-3 of FIG. 7 to a "new data" stage of each row 72-0 to 72-3 respectively. The condition of each stage of the shift register 72 is monitored by output lines (represented by arrows in FIG. 9) which are each respectively connected to coils (not shown) of one of identical relays 76. The stages of the shift register 72 on the left represent the oldest bits, and those on the right represent the current trellis connections. Contacts of the relays 76 are shown arranged in row 77-0 through 77-3 corresponding to state rows and in columns corresponding to branches. For each cycle, the comparator 68 (FIG. 7) connects a logic 1 to the data input of the row 77 corresponding to the state in which the sole survivor path ends. The relays 76 are interconnected to be able to effectively recreate a trellis diagram as in FIG. 4 (but transitions proceed from right to left in FIG. 9).

The tracing circuit of FIG. 9 thus reconstructs a trellis diagram similar to that of FIG. 4 for a received sequence. A logic one in a stage of shift register 72 energizes the corresponding relay 76 and places its contact arm 60 in a lower position to recreate a lower transition. A logic zero correspondingly places the contact arm 60 in the upper of its two switch positions as illustrated in FIG. 9 to represent what is an upper transition with respect to the description of FIG. 3. At the end of each operating cycle, bits shift from a register stage on the right one register stage left. In this manner, a new set of trellis connections of the possible received data sequences is recreated for each cycle. A logic OR gate 82 is connected at the "old data" end of the switch matrix 78 with one of its two input terminals connected to receive signals from the output upper terminals of rows 77-0 and 77-1 in the oldest data column. The other input of the gate 82 is connected to receive signals from the output upper terminals of rows 77-2 and 77-3. The correct decoded message, with the output digit being an earlier transmitted digit than the current digit, is provided at the output of the OR gate 82 as discussed in further detail in the Clark and Davis U.S. Pat. No. 3,789,360 (in which alternative realistic tracing circuits are also discussed).

SELECTION AND PROVISION OF BRANCH METRICS

As described above, in order to provide the desired operation, two storage registers 60 (FIG. 7) each provide $m$ bits of address information to a memory 45. Also, the one memory 45 is addressed by $b$ bits from the output terminal 46 and by one bit from the rescaling flip-flop 66. The memory 45 also provides $m$ bits at its output terminal 52 and one bit at its output terminal 53. Therefore, in hardware terms, the dimensions of the memory 45 must be $2^{2m+b+1}$ words by $(m+1)$ bits/word. Although commonly available tables of metric values may be utilized, it is desirable to provide a metric table which permits the values of $m$ and $b$ to be quite low. While large values of $m$ and $b$ are permissible in accordance with the teachings of the present invention, they might require the use of hardware which is quite expensive in comparison to hardware commonly used in convolutional code decoders. As described below, provision is made, in the example of a constraint length three and rate one half decoder, to set $m$ equal to three and $b$ equal to three. Thus each memory 45 would be a 1024 × 4 read only memory. Such memories, for example the Signetics 8228, are commonly available.

Since path metrics effectively result from the addition of branch metrics, a low value of $m$ is provided for by selecting a small range of branch metrics. Further, in the present invention, $b$ is not a branch metric, but an address indicative of a pair of branch metrics. If $b$ is to be a small number, each memory 43 must embody a branch metric table having a very limited number of branch metrics, since there can be no more $2^b$ combinations of branch metrics correlating transitions of all nodes during one branch interval. This is accomplished as follows.

As described above, a branch metric is the metric corresponding to the correlation of a transition into a particular state. As described with respect to FIG. 6, for a data rate one half decoder and an eight level quantization on the input, there are sixty-four possible pairs of three-bit inputs $r1$, $r2$ (seen respectively at terminals 40 and 41 in FIG. 7). Each of these pairs must be correlated to each of the four states (zero through three). The decoder must map the received pair $r1$, $r2$ into a new branch metric for each of the four possible rate one half code branches, 00, 01, 10, and 11. In other words, locations in the memories 43-0 to 43-3 must each be loaded in a manner described below.

Figure 10:
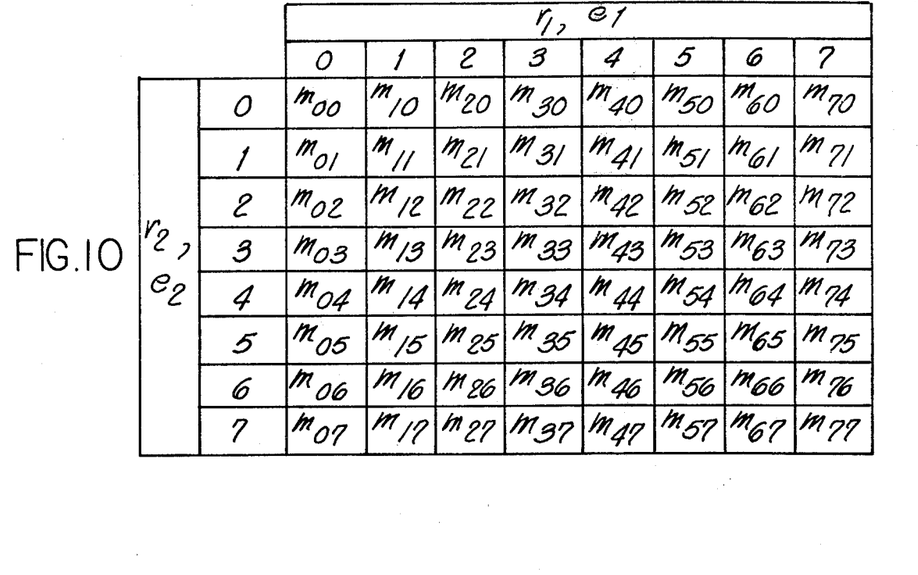
FIGS. 10–12 are charts illustrating the selection and provision of branch metrics.

There are sixty-four possible pairs of inputs $r1$, $r2$. As seen in FIG. 10, which is a generic chart of branch metric values, one metric is associated with each pair $r1$, $r2$. The metrics are designated as $r1$, $r2$. To find a metric for a pair $r1$, $r2$, find the intersection of the vertical column numbered by the analog (decimal) value of $r1$ and the row numbered by the analog value of $r2$. One location of each memory 43 is dedicated to one value of $r1$, $r2$. For convenience, the memory location may be labeled $r1$, $r2$. A rule described immediately below is set up to select error pairs $e1$, $e2$ for each value of $r1$, $r2$. The error pair is looked up on the chart of FIG. 10 to find the metric corresponding thereto, and it is that metric which is selected to be read into memory location $r1$, $r2$. The terminology error pair here is simply for convenience, and is not meant to imply an error correction function. A rule is set up that error pairs $e1$, $e2$, are generated with respect to each branch in the following manner. The error code is determined by providing the sevens complement of the decimal value of the three bit quantized number $r1$ or $r2$ if the corresponding code bit is one and taking the decimal value of the three bit number uncomplemented if the corresponding code bit is a zero. The terminology of code bits is related to the discussions of FIGS. 2 and 3 and is defined here as follows:

| State | Branch | r1 code bit | r2 code bit |
|-------|--------|-------------|-------------|
| 0 | 00 | 0 | 0 |
| 1 | 01 | 0 | 1 |
| 2 | 10 | 1 | 0 |
| 3 | 11 | 1 | 1 |

For example, suppose $r1$, $r2$ equals (2,6). Then the error pairs associated with the code branches are shown as follows:

| Branch | Memory | Error Pair (e1,e2) |
|--------|--------|--------------------|
| 00 | 43-0 | (2,6) |
| 01 | 43-1 | (2,1) |
| 10 | 43-2 | (5,6) |
| 11 | 43-3 | (5,1) |

Thus the error pairs may be arranged to access individual metrics in accordance with the values of $e1$, and $e2$ for each node. FIG. 10 may be considered to be a graph in which the abscissa is the value of $e2$, and the ordinate is the value of $e1$. Thus again for the example of $r1$, $r2$ equals (2,6) branch metrics would be loaded into memory locations 2,6 of each memory 43 as follows:

| Branch | Memory | Branch Metric |
|--------|--------|---------------|
| 00 | 43-0 | m26 |
| 01 | 43-1 | m21 |
| 10 | 43-2 | m56 |
| 11 | 43-3 | m51 |

By setting defined relationships between a set of metric values such as $m26$, $m21$, $m56$, and $m51$, the number of different numbers required to represent these metrics may be reduced. Consequently, the number $b$ required to represent the possible pairs of branch metrics may be reduced, thus simplifying processing circuitry.

Figure 11:
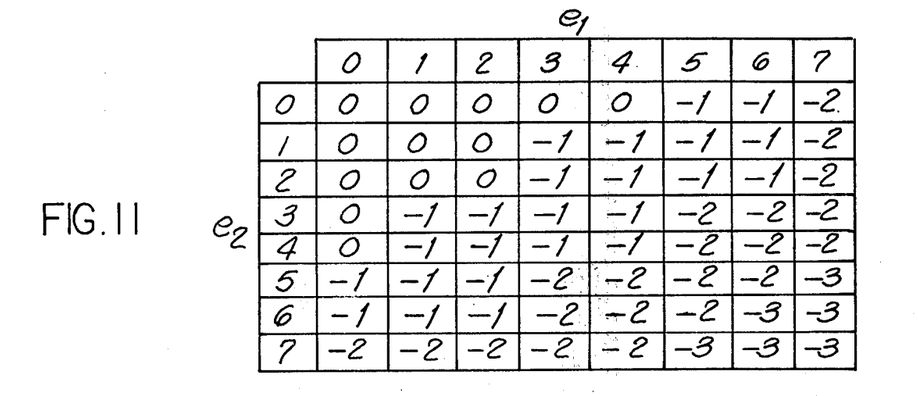

FIG. 11 is a chart (derived as discussed below) of one set of values which may be utilized in the chart of FIG. 10. In FIG. 11, because of the symmetry of the eight level quantizing of bits input bits, the metrics associated with orthogonal paths having respective error pairs ($e1$, $e2$) and ($e2$, $e1$) are made to be equal. Also, it is chosen that antipodal branches (opposite branches leading into one state, (see FIG. 2), have antipodal metrics, i.e. $me1$, $e2$ has a counterpart antipodal metric of $m(7-e1)$, $m(7-e2)$. Selection of antipodal metrics is known in good convolution coding technique.

Figure 12:
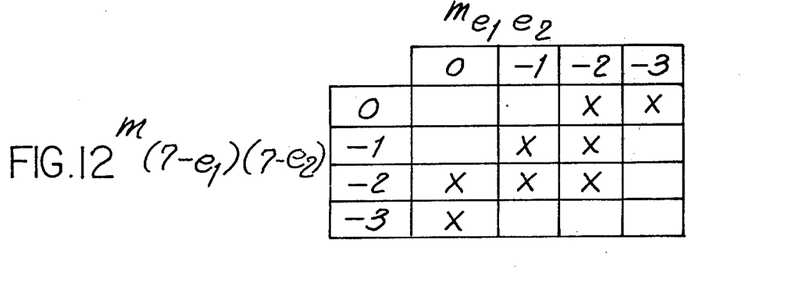

FIG. 12 is a matrix representation in which columns represent possible values of a metric and rows represent possible values of antipodal metrics. Each X in the matrix of FIG. 12 represents the coincidence of a metric and antipodal metric. As an example, consider $e1$, $e2$=2,6. In FIG. 11, the metric of 2,6 is −1. The antipodal metric of 2,6 is 5,1. The metric of 5,1 in FIG. 11 is −1. Thus, in FIG. 12, an X is placed in the box at the intersection of column −1 and row −1. Examining all sixty-four possibilities in FIG. 11 will yield the eight intersections denoted in FIG. 12.

It is remembered the value of the $b$-bit number provided by each memory 43 in FIG. 7, must specify metrics for pair antipodal metric pairs. Each intersection in FIG. 12 specifies an antipodal metric pair. Therefore, each intersection in FIG. 12 may be given a number which may be utilized as an address indicative of a metric pair. In the example of FIGS. 11 and 12 there are eight such intersections, each may be respectively associated with values 0 through 7 of the $b$-bit number. These values may be accomodated by a binary number three bits long.

Hence $b$=3. Since small values of metrics are used, $m$ may also be 3.

FIGS. 11 and 12 represent an optimized table based on a number of refinements. Metric values were selected for the chart at FIG. 10 and used in a computer program utilizing a known algorithm to calculate a union bound on decoded error rate for the table of FIG. 10 with a known mathematical computation. A "hill-climbing" procedure examined each of the entries of the metric tables sequentially and attempted to improve the union bound by changing the entry by plus one. If improvement resulted, the entry was left and the next entry was examined. If no improvement resulted, the original entry was changed by minus one. If an improvement resulted the entry was left and the next entry was examined. If there was no improvement, the entry was left at its original value and the next entry examined in a like manner. In this way, iterations were made through the table until two successive iterations resulted in the same table. The computer computes the union bound on bit error probability by a convolution of basic antipodal and orthogonal brach metric distributions determined by the table and known code distance structure. The probability of error between the two paths is computed by summing the probabilities of negative metric differences plus one-half the probability of zero metric difference. This probability is then multiplied by the number of information bit erros associated with the confusion of the two code paths. This result is the contribution of the confusion of these two paths to the overall union bound on bit error probability. Metrics less than zero were saturated to zero.

For an eight-level quantized input it is required to provide metrics for the four possible code branches 00, 01, 10 and 11 above $mr1$, $r2$, $m(7-r2)$, $m(7-r1)$, $rs$, and $m(7-r1)$, $(7-r2)$ respectively. These metrics define all possible correlations of branch interval with a possible received sequence. For convenience, this set of four required branch metrics is referred to as the branch metric "quad" for $(r1, r2)$. Since these metrics are compared to each other as described above, the relative magnitude of the members of the class consisting of the quad is of significance rather than the individual unrelated values. The metric table thus generated was further normalized to provide the table of FIG. 11. The criterion for selection of the table was the minimization of intersections of FIG. 12. The rule use in a generation of the table of FIG. 11$a$ is that the branch metric table is normalized such that the largest member of each quad is zero. In hardware implementation, negative branch metrics are represented in two's complement form. This selection of path metrics keeps circuitry simplified while maintaining accurate selection of the best sole survivor path in order to provide accurately decoded outputs.

While the invention has been described with respect to a particular constraint length code, data rate, and data input quantization level, the above teachings are intended to be generic with respect to convolution codes. The objectives of the particular hardware illustrated in FIG. 7 may be embodied in other circuitry that will readily suggest itself to those skilled in the art.

What is thus provided is an improved trellis connection computer in a maximum likelihood convolution code decoder in which data inputs access a first address indicative of branch metrics and in which another memory addressed by the first address and by prior antipodal path metrics produces an updated path metric. The necessity to calculate updated path metrics during each data cycle is thus eliminated.

What is claimed as new and desired to be secured by Letters Patent of the United States is:

1. In a convolutional code decoder for decoding data which coalesces into a predetermined plurality of possible states, said data occurring at branches corresponding to data states in a sequence, and including correlation means having a data input indicative of a message digit comprising received convolutional data and in which branch metrics are utilized to update path metrics and in which magnitudes of survivor path metrics are compared to determine the most likely sequence of received data, the improvement wherein said correlation means comprises a trellis connection computer having a first storage means associated with one possible data state of a received sequence, said first storage means being coupled to be addressed by the data input and being preset to provide an output address indicative of branch metrics associated with the likelihood of data input entering the state from one data path; second storage means for providing an updated path metric; third storage means for storing a path metric of said data path; means coupling said path metric and said output address to provide addresses to said second storages means; said second storage means being preset to provide an updated path metric in response to said address, and means for replacing said path metric with said updated path metric in said third storage means whereby said third storage means is set to address said second storage means after the occurrence of a next data input.

2. In a convolution code decoder according to claim 1, a trellis connection computer further comprising another third storage means connected to address said second storage means and providing a path metric indicative of another path capable of entering the state, said second storage means being preset to provide an output corresponding to a larger updated path metric and and indication of which path was the survivor path.

3. In a convolutional code decoder for decoding data which coalesces into a predetermined plurality of possible states, said data occurring at branches corresponding to data states in a sequence, and including correlation means having a data input indicative of a message digit comprising received convolutional data and in which branch metrics are utilized to update path metrics and in which magnitudes of survivor path metrics are compared to determine the most likely sequence of received data, the improvement wherein said correlation means comprises a trellis connection computer having a plurality of first storage means each associated with one possible data state of said convolution code, each of said first storage means being addressed by said data input and each providing an output address indicative of branch metrics associated with data paths capable of entering the data state with which said first storage means is associated; a plurality of second storage means each associated with one of said first storage means and connected to be addressed thereby; a plurality of third storage means each comprising register means coupled to an output of one of said second storage means whereby each of said third storage means stores a path metric of a data sequence ending in a data state; and means coupling each of said second storage means to be addressed by path metrics of data paths ending in data states capable of entering the state with which said second storage means is associated, each of said second storage means being preset such that when addressed by the path metrics of paths capable of entering the state with which said second storage means is associated and by an address from said first storage means, each of said second storage means provides a survivor path metric and an output indicative of which data path into the associated state was the survivor path; and means for shifting each of said survivor path metrics into one of said third storage means such that each survivor path metric comprises a path metric of a data sequence ending in the data state associated with said second storage means when a next data input is supplied to said decoder.

4. In a convolution code decoder, a trellis connection computer according to claim 3 further comprising comparator means; and means coupling said survivor metrics to said comparator means; said comparator means being arranged to provide an output indicative of which of said survivor metrics was the largest, whereby a sole survivor metric is selected.

5. The trellis connection computer according to claim 4 further comprising rescale detect circuitry coupled to the output of each of said third storage means for sensing that all survivor metrics do not exceed a predetermined threshold level, and means for providing a rescale address bit to each of said second storage means in response to a signal indicative of any one of said memory outputs exceeding said threshold.

6. The convolution code decoder of claim 5 further comprising tracing means coupled to the outputs of said third storage means and to the output of said comparator means for providing decoded outputs.

7. In a maximum likelihood decoder having a rate one-half and constraint length three convolution code, a trellis connection computer comprising: first, second, third and fourth branch metric look-up memories, data input means addressing said branch metric look-up memories, each of said branch look-up memories being associated with one possible data state and being preset to provide an output indicative of branch metrics to update path metrics of paths capable of entering the possible data state, first, second, third, and fourth path metric update memories, said first, second, third and fourth metric look up memories being respectively connected to said first, second, third and fourth update memories, first, second, third and fourth survivor metric storage registers respectively connected to said first, second, third and fourth path metric update memories and means addressing said update memories in response to output accessed from said look up memories and means addressing said first and second update memories from said first survivor storage register, means addressing said third and fourth update memories from said second survivor metric storage register, means addressing said first and second update memories from said third storage register, and means addressing said third and fourth update memories from said fourth address register, said update memories being set such that so addressed each memory provides an updated path metric to one of said storage metric registers and provides an output indicative of the transition which was selected to obtain the survivor metric.

* * * * *